United States Patent

[11] 3,633,161

| [72] | Inventor | Charles W. Price<br>Route 1, Iowa Falls, Iowa 50126 |
|---|---|---|
| [21] | Appl. No. | 856,347 |
| [22] | Filed | Sept. 9, 1969 |
| [45] | Patented | Jan. 4, 1972 |
| | | Continuation-in-part of application Ser. No. 708,721, Feb. 27, 1968, now abandoned. This application Sept. 9, 1969, Ser. No. 856,347 |

[54] ALL DIRECTIONAL WARNING DEVICE FOR SLOW-MOVING VEHICLES
10 Claims, 5 Drawing Figs.

[52] U.S. Cl. ............................................. 340/133,
340/81, 340/72, 350/99, 350/101, 350/102, 340/331
[51] Int. Cl. ..................................... G08b 5/30, G08b 5/38
[50] Field of Search.......................................... 340/133, 50, 81, 144, 72, 331; 350/97, 99, 101, 102, 103

[56] References Cited
UNITED STATES PATENTS
| 2,814,029 | 11/1957 | McRea ........................ | 340/50 X |
| 3,310,357 | 3/1967 | Hogan ........................ | 350/99 |

Primary Examiner—John W. Caldwell
Assistant Examiner—William M. Wannisky
Attorney—Lowe and King ABSTRACT: A rotating beacon is provided which is in the shape of a pyramid having upwardly and inwardly extending corners defining a plurality of sides. The corners provide a discernible reduction in light thus giving a pattern of intermittent flashing of light from the side panels of the pyramid member upon rotation. The enclosed pyramid member tapers upwardly at an angle of substantially 20° directing either reflected or projected light in an upwardly and outwardly direction. The bottom of the pyramid is enclosed with a reflective member and a gearwheel reinforcing the bottom supports the pyramid member and allows the same to be rotated by an electric motor.

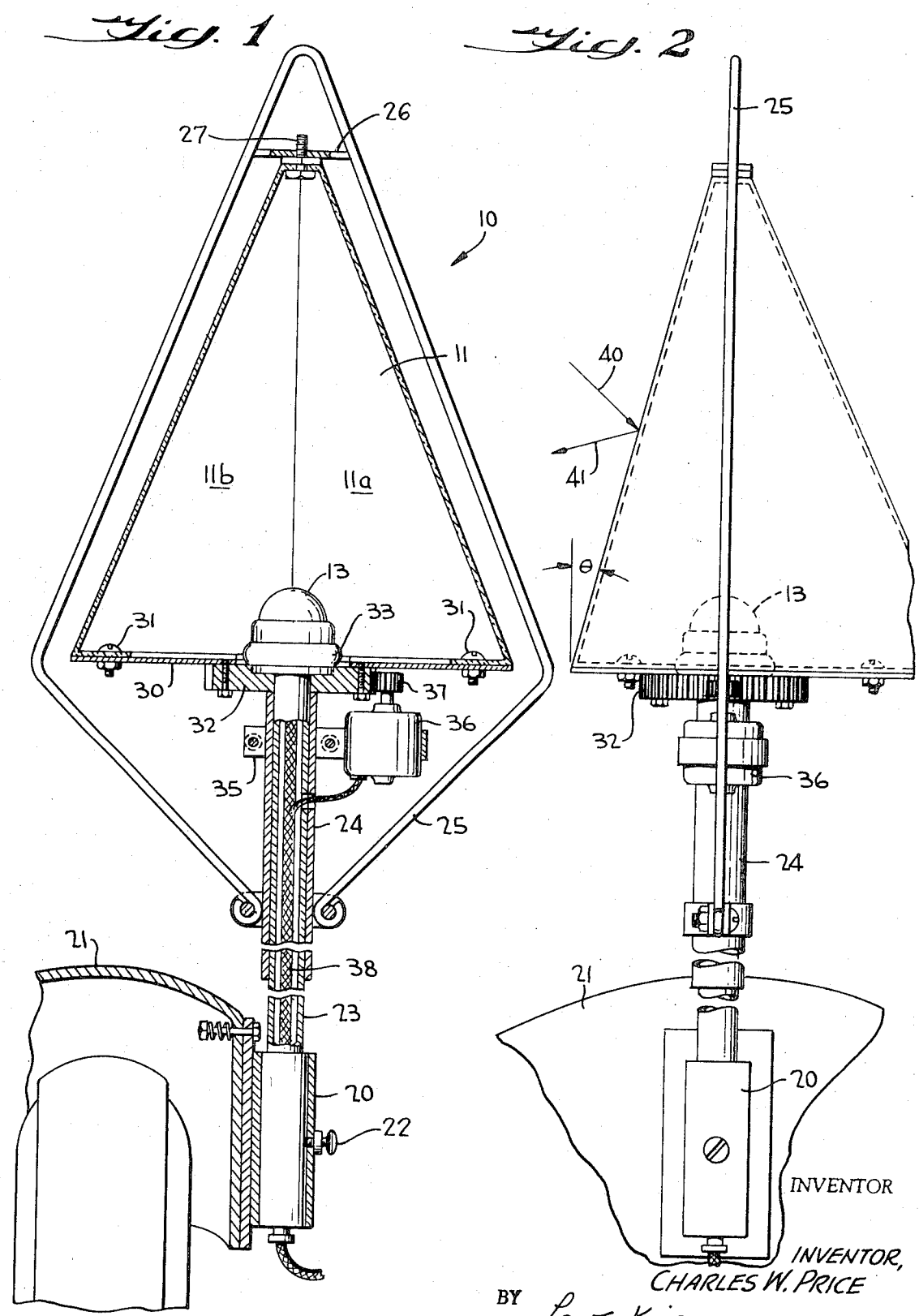

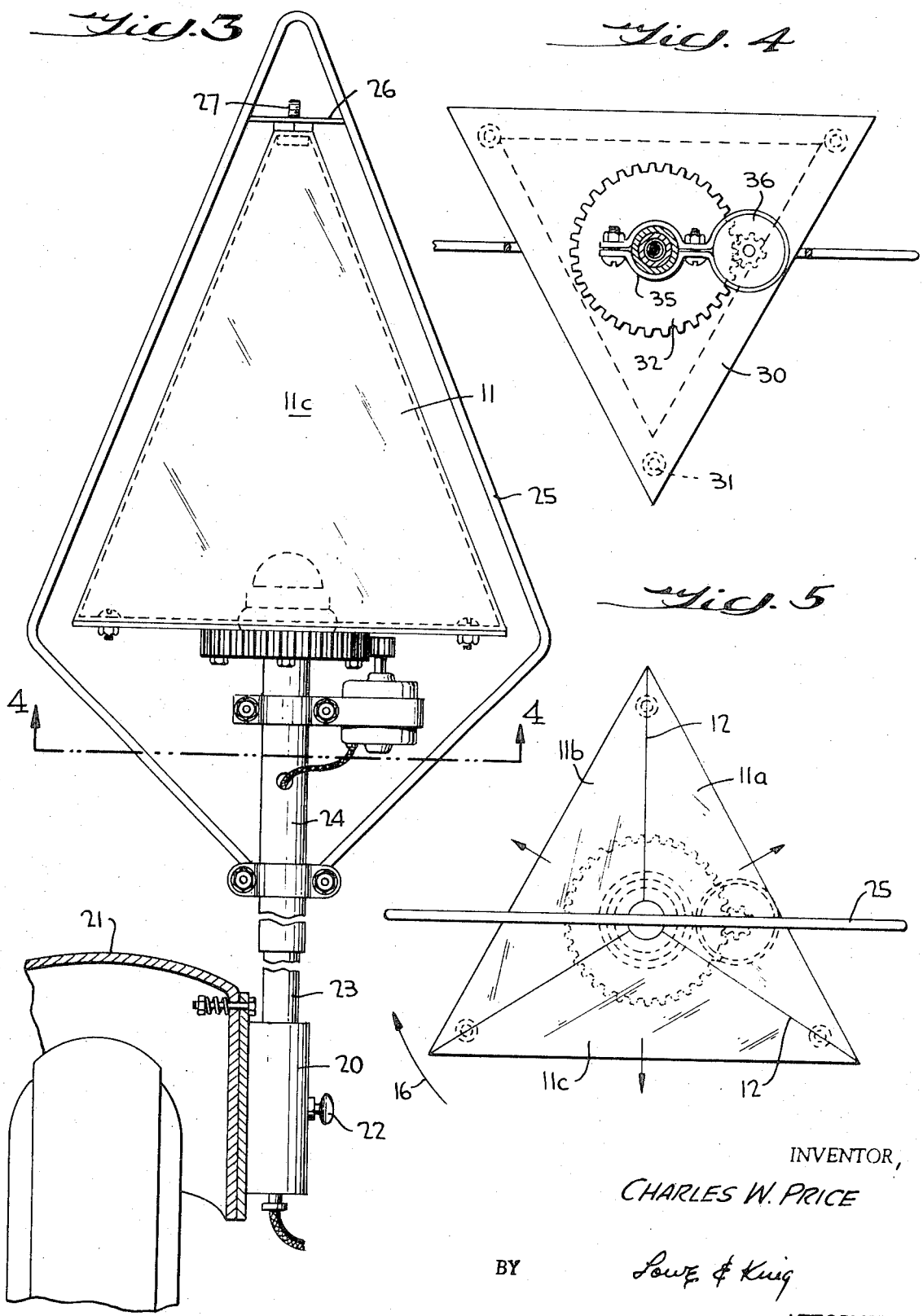

ALL DIRECTIONAL WARNING DEVICE FOR SLOW-MOVING VEHICLES

The present application is a continuation-in-part of my copending application entitled "Warning Device for Approaching Vehicles," Ser. No. 708,721, filed Feb. 27, 1968, now abandoned.

In the past, many arrangements have been proposed for construction of rotating beacons for indicating danger, particularly on the highways. Such devices usually include a plurality of lights which are rotated in a horizontal plane to intermittently present the flashes of light shining in the beholder s DIRECTION. WHILE THESE DEVICES HAVE PROVED FEASIBLE FOR INSTALLATION ON POLICE PATROL CARS AND THE LIKE, THEY ARE VERY COMPLICATED IN STRUCTURE AND EXPENSIVE TO MANUFACTURE WHICH MAKES THEM UNADAPTABLE FOR WIDE USE BY CITIZENS TO PERFORM A SIMILAR WARNING FUNCTION ON PRIVATE SLOW-MOVING VEHICLES, SUCH AS TRACTORS AND THE LIKE. ALSO, THERE IS A NEED FOR LESS EXPENSIVE ROTATING BEACONS FOR USE AS PERMANENT, STATIONARY ROADSIDE WARNING MARKERS, HIGH BUILDING MARKERS FOR AIRCRAFT AND THE LIKE.

In my copending application there is described and claimed a rotating beacon which is responsive to these objectives. This previous device is operative to provide flashes of light resulting from rotation of crisscrossed panels positioned above a stationary light. The present case is concerned with the same type of beacon but which is constructed in an improved manner to give certain operational and other advantages.

Thus, it is one object of the present invention to provide an improved rotating beacon which is inexpensive to manufacture and particularly adapted to warn of hazards on the highway, such as slow-moving vehicles, or to indicate similar stationary hazardous conditions.

It is another object of the present invention to provide a rotating beacon having a plurality of lighted panels thereby providing alternate flashes of light.

Still another object is to provide a rotating beacon presenting alternate lighted panels and corners with the desired contrast for producing a flashing effect to any position around a 360° perimeter.

To refer briefly to the apparatus of the present invention, the above objectives are met by the improved structure of the present invention by providing an enclosed pyramid preferably having three illuminated side panels and which is rotated about a vertical axis. The pyramid may be reflective, in which case the light is received from an outside source, such as the sun, and then transferred or directed outwardly from the sides of said pyramid member thus making the intermittent flashes of light easily visible for an approaching car or pedestrian. Also, in the preferred embodiment the side panels are brightly colored (e.g., red, orange or yellow, depending upon the laws or regulations in the particular area where the device is being utilized) and translucent so that light may be irradiated from the side panels supplied by a light positioned at the center of the pyramid member.

The interior bottom of the pyramid member is or may be fabricated of reflective metal to increase the light intensity inside and thus the light being emitted from the side panels. The pyramid member is preferably fabricated of shiny, colored plastic so that the beacon will be highly effective at night, and also operative during daylight hours.

The bottom of the pyramid member has a gearwheel attached thereto for rotation by a driving pinion and electric motor. The gearwheel serves to reinforce and support the pyramid; the center of said gearwheel being rotatably journaled on an upstanding shaft. The light bulb within the pyramid member has a rigid base and cooperates with the top of the gearwheel. A support tube is mounted coaxially along the shaft with the upper end adapted to engage the underneath side of said gearwheel for support.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

In the drawings:

FIG. 1 is a front view of a rotating beacon, constructed in accordance with the teachings of the present invention, with the parts being in cross section for a clearer understanding;

FIG. 2 is a side view of the rotating beacon illustrated in FIG. 1;

FIG. 3 is a front view of the rotating beacon like that of FIG. 1 but not in cross section;

FIG. 4 is a cross-sectional view taken along line 4—4 of FIG. 3 showing the underneath side of the rotating beacon; and FIG. 5 is a top view of the rotating beacon.

With reference now to FIGS. 1, 3 and 5 of the drawings, a more detailed description of the apparatus of the present invention can be given. In these figures, there is shown a rotating beacon 10 constructed in accordance with the principles of the present invention and comprising a pyramid member 11 preferably having three panels 11a, 11b (see FIG. 1) and 11c (see FIG. 3). As can best be seen in FIG. 5, the three panels 11a, 11b, 11c are defined by corners 12 which extend in an upwardly direction to an apex at the top of the pyramid member 11. It should be understood that while three panels 11a–11c have been illustrated, four or more panels could be employed if desired without departing from the broad aspects of the present invention.

The panels 11a–11c are preferably made of translucent, colored plastic which is capable of illumination from the interior by a suitable clear light bulb 13 (see FIG. 1). With the light on, each of the panels 11a–11c directs colored light in an outward direction as noted by the directional arrows in FIG. 5. As the pyramid member 11 rotates, as indicated by the arrow 16 in FIG. 5, each of the panels 11a–11c is successively brought into view of any stationary position around the 360° perimeter of the beacon 10. When any of the panels 11a–11c are directly opposite the position from which the beacon 10 is being viewed, the light being received is at a maximum and thus gives a flash effect to the viewer. As each corner 12 is successively brought into view the light being transmitted is at a minimum since the two adjacent panels are now directing their light at an angle of 60° to the sides of the viewing position. Also, the bulb 13 is positioned at the center of the pyramid so that it is equidistant from the panels 11a–11c and with the corners 12 being at a greater distance, whereby the center of each panel 11a–11c receives the maximum direct light and the corners 12 the minimum. In other words, each corner 12 necessarily provides a reduction in light being transferred through the panels from the light bulb 13. Putting this reduction in sequence with the maximum light received when the panels 11a–11c are directly opposite the position from which the beacon 10 is being viewed, intermittent flashing of light is given off which is highly effective to warn of the impending danger.

The illumination of the panels 11a–11c from behind gives a uniformity across the panels which makes the full surface area of each highly visible at great distance. While the moving of the triangularly shaped panels 11a–11c into and out of full vision gives effective flashing action, at the same time the overall illuminated width of the pyramid member 11 remains visible to a lesser degree. This means that the beholder sees the illuminated triangularly shaped warning beacon 10 at all times, but with the intensity constantly changing between a flash and a minimum to draw and keep the beholder's attention.

To suitably mount the beacon 10, a socket 20 may be attached to the fender 21 of a tractor or other vehicle. Fixedly secured in the socket 20 by a suitable thumbscrew 22 is an upstanding shaft 23 forming the basic support for the pyramid member 11. Fixedly secured to the shaft 23 is a support tube 24, which in turn provides a mounting for a wire guard 25 in the shape of a diamond. At the top of the guard member 25 is provided a suitable bearing 26 for journaling an upstanding shaft 27 of the pyramid member 11. Shafts 23 and 24 can be slidably mounted relative to each other, in the manner indicated in my previously mentioned copending application to enable lamp 13 and pyramid assembly 11 to be vertically translated relative to fender 21.

A flat triangularly shaped piece of metal forms the bottom 30 of the pyramid member 11 (see FIGS. 1 and 4) by attachment through any number of suitable bolt-and-nut combinations 31. The center of the bottom 30 is provided with an opening for receiving the light bulb 13, and mounted concentrically with this opening is a driving gear 32 having its center journaled on the shaft 23. The presence of the gear 32 substantially strengthens the bottom 30 of the pyramid member 11 while advantageously serving as the journaled support. As will be noted in FIG. 1, the support in the vertical direction is gained by cooperation of the gear 32 with rigid socket 33 for the light bulb 13 mounted on the top of the shaft 23 and by the upper end of the support tube 24.

A bracket 35 supports an electric motor 36 on the support tube 24 in position so that drive pinion 37 meshes with the gearwheel 32. The light bulb 13 and the motor 36 are supplied with electrical power through a suitable electrical harness 38 extending through the shaft 23, as shown in FIG. 1.

As best shown in FIG. 2, the formation of a pyramid insures that the panels 11a–11c are positioned at an acute angle $\theta$ to the vertical. This assures that the light being emitted or transferred from said panels 11a–11c is directed slightly upwardly and outwardly so that the maximum flashing light can be readily seen by persons approaching.

It should be noted that while the rotating beacon 10 is particularly useful at night when illuminated by the light bulb 13, the panels 11a–11c may be made reflective so that during the day the sun's rays will be mirrored from the panels thus giving a flashing light and warning to people approaching. Since the panels 11a–11c are at the angle $\theta$, preferably 15° to 25° as illustrated, the sun's rays are readily accepted, such as along the path indicated by arrow 40 in FIG. 2, and then directed in a substantially horizontal direction away from the beacon 10, as denoted by the arrow 41.

The pyramid shape of the member 11 assures maximum rigidity to the beacon 10 since each of the corners 12 which serve to reinforce the structure is supported at the apex of said member 11 by the shaft 27; it being remembered that the lower edges are supported by the reinforced bottom 30. The enclosed pyramid of panels 11a–11c also protect the light bulb 13 from the weather and outside forces; the motor 36 also being afforded some protection by being positioned underneath (see FIGS. 1 and 3).

In view of the foregoing description, it will be clear that a rotating beacon which is simple in design and highly effective for transmitting a flashing warning has been provided by the device of the present invention. The pyramid member 11 provides a highly effective transmitting medium and the rotation of the member 11 results in the intermittent change of light intensity from the full panel 11a–11c (maximum) to a corner 12 (minimum) and back to the full panel. The structure is characterized by simplicity of design and strength to make the rotating beacon 10 particularly suited for wide use on tractors, as well as other vehicles, and at stationary danger points along the highway.

In this disclosure, there is shown and described only the preferred embodiment of the invention, but, as aforementioned, it is to be understood that the invention is capable of various changes or modifications within the scope of the inventive concept as expressed herein.

I claim:

1. A warning device for vehicles comprising an enclosed pyramid member capable of transfer of light, means for journaling said pyramid member for rotation, said pyramid member having upwardly extending corners defining a plurality of said panels, said corners providing discernible reduction in light transfer from that of said panels, and means for rotating said pyramid member to cause a pattern of intermittent flashing of light from said panels of said pyramid member, said pyramid member including a flat bottom, a gearwheel positioned on said bottom, said rotating means including a pinion for driving said gearwheel and a motor for driving said pinion, said journaling means including an upstanding shaft for rotatably mounting said gearwheel.

2. The warning device of claim 1 wherein said rotating means comprises an electric motor for continuously driving said pyramid member.

3. The warning device of claim 1 wherein said bottom includes an opening concentric with said gearwheel, and a light extending through said opening to illuminate said pyramid member.

4. The warning device of claim 3 wherein said light is provided with a circular base for engaging the upper surface of said gearwheel and a stationary tube concentric with said shaft having an end face is provided for engaging the underneath side of gearwheel.

5. A warning device for vehicles comprising an enclosed pyramid member capable of transfer of light, means for journaling said pyramid member for rotation, said pyramid member having upwardly extending corners defining a plurality of said panels, said corners providing discernible reduction in light transfer from that of said panels, and means for rotating said pyramid member to cause a pattern of intermittent flashing of light from said panels of said pyramid member, said pyramid member being translucent and a light being provided within said pyramid member to illuminate the same.

6. The warning device of claim 5 wherein said light is positioned at substantially the center of said pyramid member whereby said panels are substantially equidistant therefrom and said corners are positioned at a greater distance from said light than said sides.

7. The warning device of claim 5 wherein the interior bottom of said pyramid member is reflective to increase the light passing through said pyramid member.

8. The warning device of claim 5 wherein said pyramid member is colored plastic for ease of sighting.

9. The warning device of claim 5 wherein said pyramid member is positioned in the upright position, said panels and said corners merging at the top, whereby light received is radiated upwardly and outwardly by said panels.

10. The warning device of claim 5 wherein said panels taper upwardly at an angle of substantially 20°.

* * * * *